United States Patent
Smith

(10) Patent No.: US 6,973,896 B2
(45) Date of Patent: Dec. 13, 2005

(54) BIRD-FEED CATCHER

(76) Inventor: Ron Smith, 12535 Barabara Dr., Kenton, OH (US) 43326

( * ) Notice: Subject to any disclaimer, the term of this patent is extended or adjusted under 35 U.S.C. 154(b) by 0 days.

(21) Appl. No.: 10/779,013

(22) Filed: Feb. 17, 2004

(65) Prior Publication Data

US 2005/0178338 A1 Aug. 18, 2005

(51) Int. Cl.[7] .......... A01K 1/10; A01K 39/00; A01K 5/00
(52) U.S. Cl. .......... 119/61.1; 119/469; 119/462; 119/467; 119/428; 248/317; 248/318; 248/320; 47/67
(58) Field of Search .......... 119/61.1, 428–435, 119/475, 52.2, 57.8, 61.57, 469, 900, 462, 119/463, 52.3, 57.9, 467; 248/317, 318, 320; 47/41.11, 67; D30/124

(56) References Cited

U.S. PATENT DOCUMENTS

| | | | | |
|---|---|---|---|---|
| 137,980 A | * | 4/1873 | Vanstone | 119/429 |
| 2,045,472 A | * | 6/1936 | Kearney et al. | 119/469 |
| 2,452,826 A | * | 11/1948 | Backs | 248/95 |
| 2,801,611 A | * | 8/1957 | Decker | 119/57.8 |
| 2,987,041 A | * | 6/1961 | Bard | 119/52.3 |
| 3,134,361 A | * | 5/1964 | Decker | 119/53 |
| 3,151,600 A | * | 10/1964 | Crouch et al. | 119/57.8 |
| D205,896 S | * | 10/1966 | Soderlind | D30/124 |
| 3,867,788 A | * | 2/1975 | Mickelson | 47/67 |
| 5,040,491 A | * | 8/1991 | Yancy | 119/57.8 |
| 5,215,040 A | * | 6/1993 | Lemley | 119/57.9 |
| 5,988,111 A | * | 11/1999 | Kujath | 119/469 |
| 6,390,021 B1 | * | 5/2002 | Krenzel | 119/52.2 |
| D469,930 S | * | 2/2003 | Bloedorn | D30/124 |
| 2002/0121246 A1 | * | 9/2002 | Harman | 119/61 |
| 2003/0150391 A1 | * | 8/2003 | Rich | 119/57.8 |
| 2004/0099223 A1 | * | 5/2004 | Ruff | 119/433 |

FOREIGN PATENT DOCUMENTS

CA 2114164 * 3/1994 .......... A01K 39/26

* cited by examiner

*Primary Examiner*—Peter M. Poon
*Assistant Examiner*—Andrea M. Valenti

(57) ABSTRACT

The suspended bird-feed catcher of the present invention includes a pan suitable for receiving and holding bird feed that falls out of a bird feeder and prevents the bird feed from falling to the ground. The pan is suspended from the same apparatus from which the bird feeder is suspended so the pan can be easily removed without disrupting the bird feeder.

1 Claim, 3 Drawing Sheets

US 6,973,896 B2

BIRD-FEED CATCHER

CROSS REFERENCE TO RELATED APPLICATION

Not Applicable

STATEMENT REGARDING FEDERALLY SPONSORED RESEARCH OR DEVELOPMENT

Not Applicable

REFERENCE TO SEQUENCE LISTING

Not Applicable

BACKGROUND OF INVENTION

This invention generally relates to bird feeders and, more particularly, to bird feeders with at least one removable component.

A popular pastime for people around the world is observing birds. An old and successful technique for attracting birds for viewing is to suspend a bird feeder from a tree branch or other elevated member in plain view of the observer.

Existing bird feeders take a wide variety of forms, but typically include a cylindrical, rectangular, or conical shaped dispenser, the lower end of which is formed into, or is attached to, a receptacle. The dispenser has an inlet at or near its upper end for receiving bird seed and an outlet at or near its lower end for dispensing bird seed. Bird seed gravitationally dispenses from the dispenser into the receptacle as the bird seed is consumed by birds. However, the birds, while perched on this receptacle throw out large quantities of seed. A bird-feed catcher can be positioned beneath the bird feeder to collect the seed which is thrown out. Having the bird-feed catcher attached to the same mechanism used to suspend the feeder allows for the catcher to move freely due to natural forces and be easily removed for cleaning and bird seed recycling without disrupting the feeder mechanism.

Conventional bird feeders and bird houses for wild birds typically are positioned on a pole or suspended from a structure or a plant such as a tree limb. It has been found, however, that birds throw out and waste their feed by scattering it as they eat it. Typically, the bird seed is wasted on surfaces that it falls onto. The area must be cleaned if it is a flat surface such as cement or wood. If it is ground or garden, however, the wasted seed sprouts and grows into a mixture of unwanted plants and weeds. In any environment, the wasted bird seed creates various forms of unwanted nuisance.

There is no known catcher of bird feed that can be used with the most desirable and attractive bird feeders and bird houses. Some bird feeders have provisions for catching and some for reusing wasted bird seed. However, they are not attractive to most wild birds and, therefore, defeat the purpose of bird feeding. Furthermore, the existing devices that prevent bird seed from falling to the ground attach directly to the bird feeder or pole and cannot be used independently from the feeder. Examples of different but related art is described in the following patent documents. U.S. Pat. 5,711,247 issued to Henshaw on Jul. 15, 1996 and 5,775,256, issued to Henshaw on Jul. 7, 1998 described a bird-feed recycler attached to a pole that is positioned beneath a feeder, but was immobile and difficult to remove from its position to clean out pan. U.S. Pat. No. 4,940,019, issued to Coffer on Jul. 10, 1990, described a bird feeder having a cascaded series of feed catchers and recycling feeders that was mechanically effective but not attractive to either birds desired to be attracted or to bird-watcher individuals. It could not be used with other types of more attractive and more effective bird feeders. U.S. Pat. No. 2,786,446, issued to Newman on Mar. 26, 1957, taught a bird feeder with a relatively large platform that was not adequate for collecting wasted seed or for recycling it. Further, it hid birds from view of bird watchers who were not at a sufficiently high position for viewing across the platform. U.S. Pat. No. 2,715,386, issued to Jones on Aug. 16, 1955, taught a bird feed and water station having conical feed and water containers without provision for catching and recycling wasted bird feed.

BRIEF SUMMARY OF THE INVENTION

In light of need for catchers and recyclers of bird feed wasted at bird feeders, objects of this invention are to provide a bird-feed catcher as an accessory to existing bird feeders. The bird-feed catcher can be used with any type of suspended bird feeder and wherever suspended bird feeders are positioned. It can also be used as a bird feeder by itself and facilitates the recycling of bird seed that would otherwise be wasted. Furthermore, it prevents waste and litter of wasted bird seed and subsequent growth of weeds and undesired plants from wasted bird seed.

This invention accomplishes these and other objectives with a bird-feed catcher having a pan-type frame sized, shaped and structured for positioning under a bird feeder according to the dimensions of the bird feeder. The suspended bird-feed catcher has an attachment apparatus that connects to the same mechanism for suspending the bird feeder.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are described briefly as follows:

DESCRIPTION OF THE PREFERRED EMBODIMENT

Figures 1, 1A:
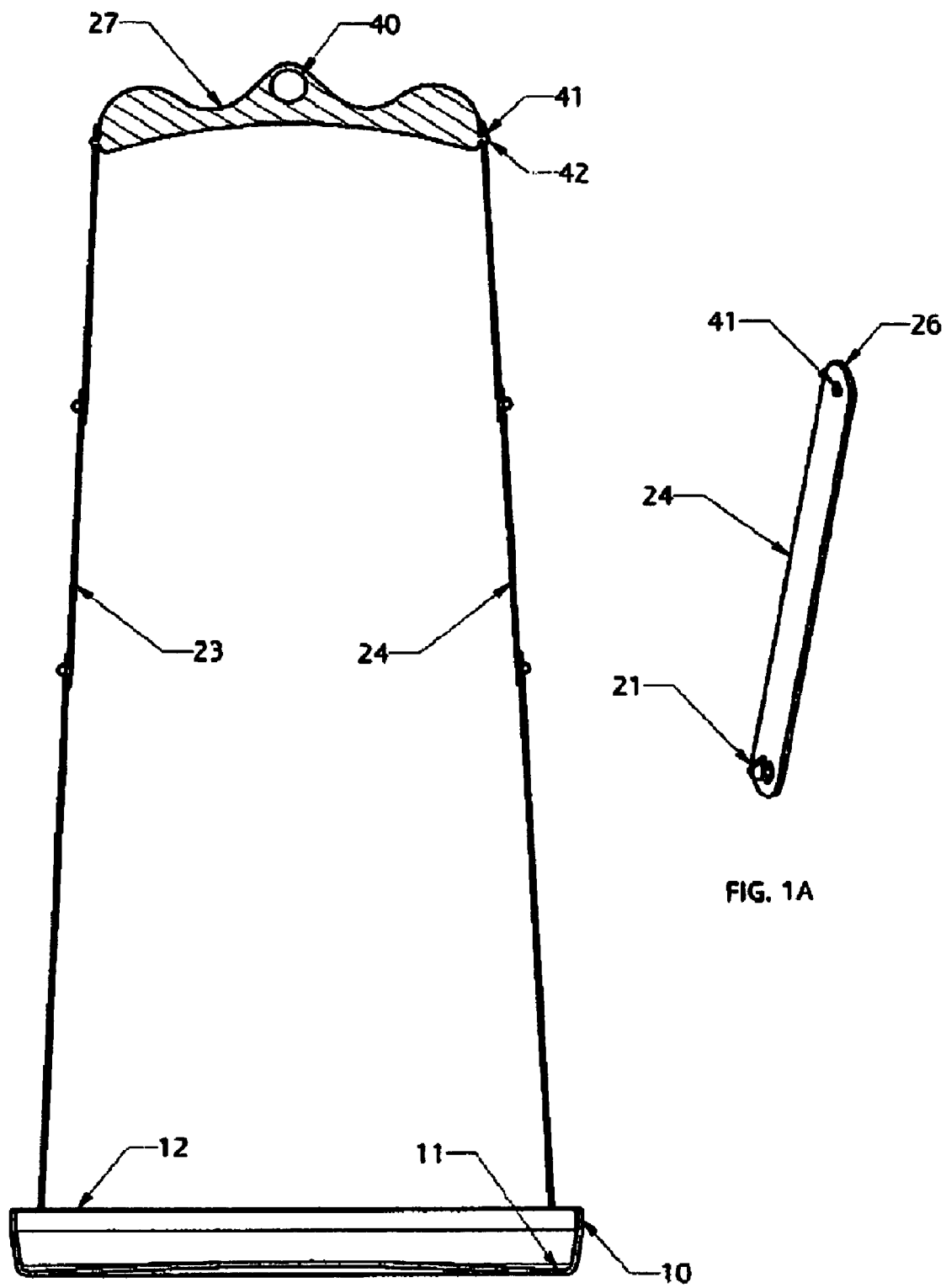
FIG. 1 is a side view of a bird-feed catcher.
FIG. 1A is a view of a leg.
Figures 3, 3A, 3B:
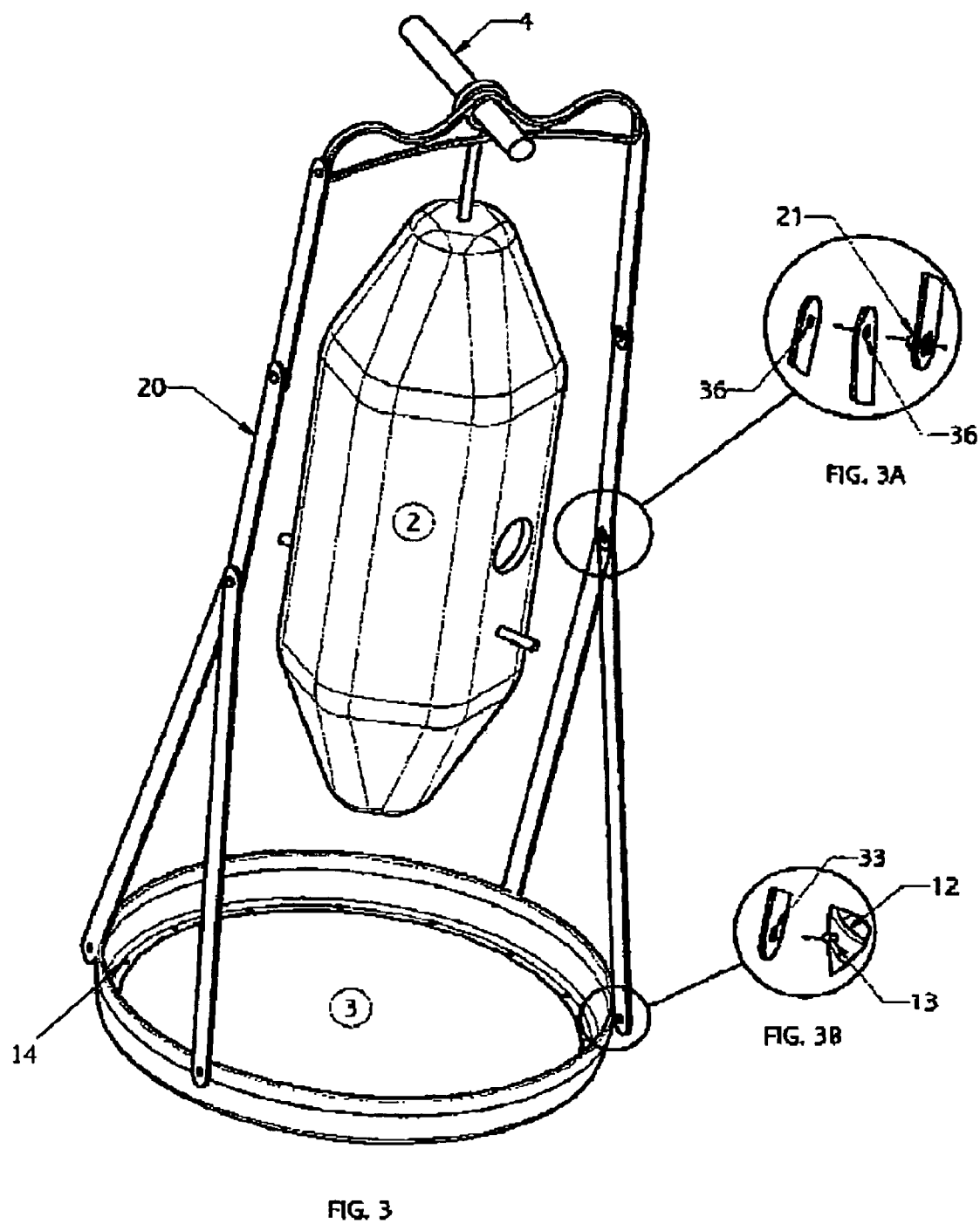
FIG. 3 is a perspective view of a bird-feed catcher being used in conjunction with a bird feeder.
FIG. 3A is an enlarged view of the connection of the longitudinal legs and the suspension apparatus.
FIG. 3B is an enlarged view of the connection of the legs with the rim by a fastner.

Reference is made first to FIGS. 1 and 3. A base frame 10 is positioned vertically below a bird feeder 2 that is suspended from a tree limb, structure, etc by a bird feeder suspension device 4. The base frame 10 has a bottom 11 and a rim 12 to which a suspension system 20 is attached. The suspension system 20 hangs below the bird feeder 2 and attaches to the bird feeder suspension device 4. The base frame 10 can be sized, shaped and structured for use in a variety of locations. It can be round, rectangular or have a desired plurality of sides to which rim 12 can be attached. The base frame 10 is generally convex in form to allow moisture to run off toward the rim 12. The base frame may be fabricated out of screen, mesh, plastic, or any other material suitable to hold bird seed and feed 3 and maintain desired shape. The base frame 10 may have at least one aperture (14) to allow moisture to drain from the bottom 11.

Figure 2:
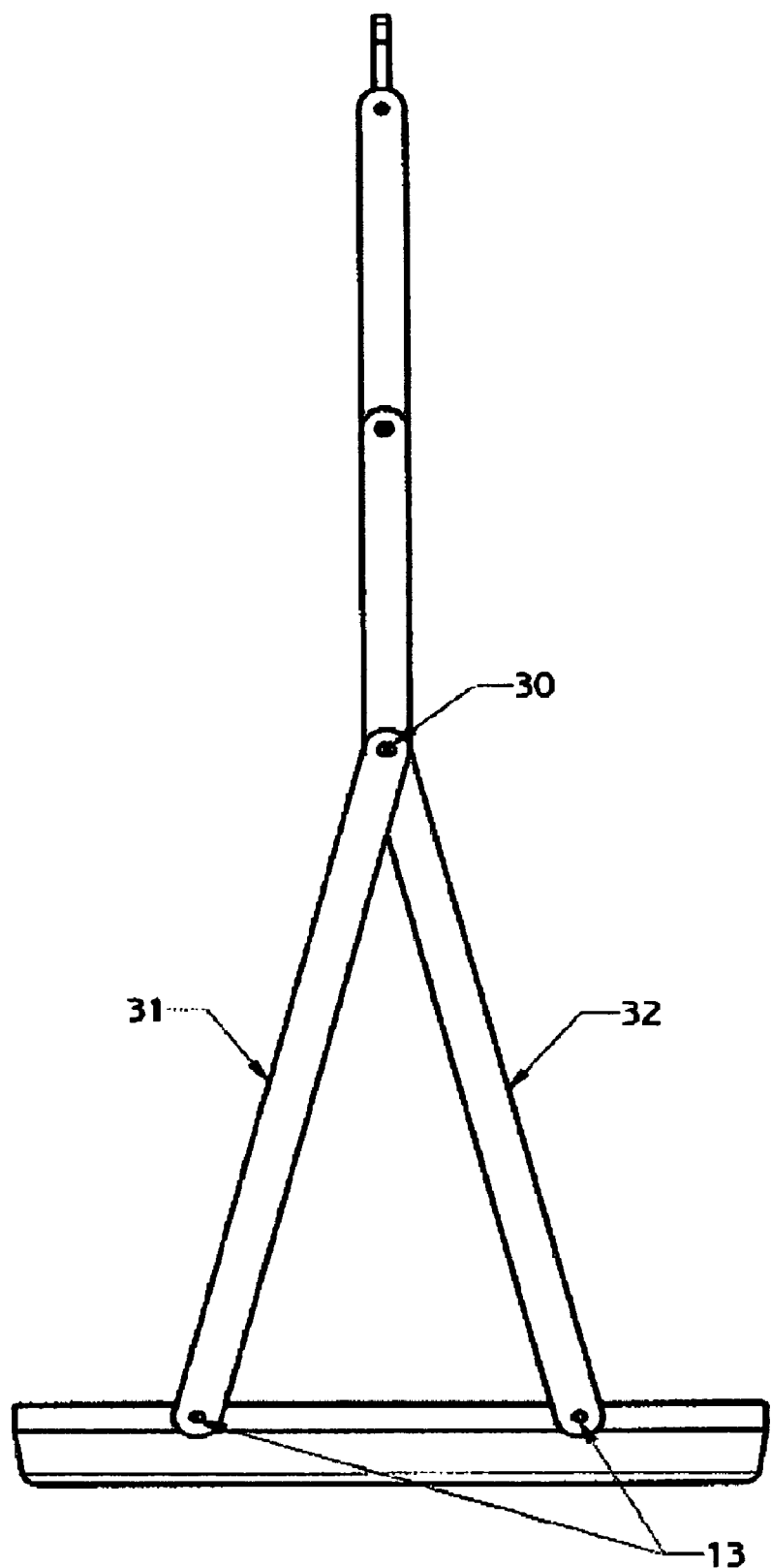
FIG. 2 is a side view of a bird-feed catcher suspended from a bird feeder suspension device depicting the positioning of the suspension legs.

The bird feeder 2 can be a conventional item with which this bird-feed catcher is used. The suspension system 20 is made up of a at least one leg 24 and a suspension apparatus 27 which has an aperture 40 which removably attaches to the bird feeder suspension device 4. The suspension system preferably has a pair of legs, 23 and 24 which are positioned diametrically opposite one another on the base frame 10 and positioned diametrically opposite one another on the suspension apparatus 27. The legs 23 and 24 are identical and have a fastener end 21 and a fastening receiver end 26 which has an aperture 41 able to receive the fastener end 21 or the apparatus fastener 42. The suspension apparatus 27 has an apparatus fastener 42 which connects to the fastening receiver end 26 of a leg 23 or 24. The fastener end 21 can attach to the longitudinal legs 32 and 32 at a node 30 or directly to the rim 12 which has a rim fastener 13. (FIG. 2) Legs 23, 24 are attached to longitudinal legs 31, 32 at node 30, by a top end aperture 36 of longitudinal legs 31, 32 to the fastener end 21 of leg 23, 24. (FIG. 3A) The bottom end aperture 33 of longitudinal legs 31, 32 is attached to rim fasteners 13 which are spaced at a predetermined distance to maximize stability of the base frame 10 when suspended beneath a bird feeder 2. (FIG. 3B) The spacing between the rim fasteners 13 will determine the measurement of the angle formed at node 30. Longitudinal legs 31, 32 and legs 23, 24 are of a predetermined length so as to suspend below any bird feeder 2 and attach to the bird feeder suspension device 4 via the suspension apparatus 20.

A wide selection of fasteners are foreseeable. A simple nodule is shown on fastener end 21, rim fastener 13, and apparatus fastener 42. The fasteners shown are formed onto the member and this depiction is only intended to be representative of fasteners that may be used. Types of fasteners employed can be selected as appropriate for different types of bird-feeder suspension mechanisms and different sizes and shapes of base frames 10. The legs are of materials such as a rope, chain, plastic rod, etc.

In the absence of a bird feeder 2, the bird-feed catcher can be used as a pan holding bird seed and feed 3 to enable bird to feed directly from this invention. Bird seed and feed 3 can be placed directly on the base frame 10 so that birds can land on the rim 12 on the bird-feed catcher and feed as desired.

A new and useful bird-feed catcher having been described, all such modifications, adaptations, substitutions of equivalents, mathematical possibilities of combinations of parts, pluralities of parts, applications and forms thereof as described by the following claims are included in this invention.

I claim:

1. A bird feeder and a bird-feed catcher, said bird-feed catcher comprising:
    a base frame sized, shaped and structured for positioning on a generally planar surface wherein said base frame has at least one aperture sized, shaped, and positioned to allow moisture to drain ff but not allow bird fed to fall through;
    a rim having at least two fasteners and said rim fixedly attached to a perimeter of said base frame;
    a suspension system on said rim, said suspension system sized, shaped and structured to suspend from a bird feeder suspension device wherein said suspension system comprises a pair of legs having a bottom end and a top end, said bottom end connected to said rim at said fasteners positioned diametrically opposite one another and said pair of legs extending vertically upward wherein said top end is attached by said fasteners at diametrically opposite locations on a suspension apparatus sized, shaped, and structured to suspend from said bird feeder suspension device.

* * * * *